United States Patent [19]
Petsinger

[11] Patent Number: 6,121,544
[45] Date of Patent: Sep. 19, 2000

[54] ELECTROMAGNETIC SHIELD TO PREVENT SURREPTITIOUS ACCESS TO CONTACTLESS SMARTCARDS

[76] Inventor: Julie Ann Petsinger, 32W567 Rochefort La., P.O. Box 437, Wayne, Ill. 60184

[21] Appl. No.: 09/007,650

[22] Filed: Jan. 15, 1998

[51] Int. Cl.[7] .................................................. H05K 9/00
[52] U.S. Cl. ........................ 174/35 R; 150/147; 206/37; 206/709; 361/737; 361/816
[58] Field of Search ..................... 361/737, 816, 361/818; 174/35 R, 35 MS, 35 GC; 257/659, 660, 679; 150/147; 206/37, 709

[56] References Cited

U.S. PATENT DOCUMENTS

| | | | |
|---|---|---|---|
| 4,340,770 | 7/1982 | Bridges et al. | 174/35 MS |
| 4,647,714 | 3/1987 | Goto | 174/36 |
| 4,674,628 | 6/1987 | Prinsloo et al. | 206/38.1 |
| 4,697,698 | 10/1987 | Holdener | 206/39.4 |
| 4,851,610 | 7/1989 | LeBlanc et al. | 174/35 R |
| 5,005,106 | 4/1991 | Kiku | 361/816 |
| 5,080,223 | 1/1992 | Mitsuyama | 206/39.5 |
| 5,125,505 | 6/1992 | Kurosaki | 206/39.4 |
| 5,288,942 | 2/1994 | Godfrey | 174/35 R |
| 5,337,813 | 8/1994 | Ritter | 150/147 |

*Primary Examiner*—Kristine Kincaid
*Assistant Examiner*—Hung V Ngo

[57] ABSTRACT

An Electromagnetic Shield for Smartcards provides shielding of contactless smartcards or RFID tags from electromagnetic radiation which imparts energy to power the contactless smartcards or RFID tags and thus preventing surreptitious, wireless exchanges of digital data with a remote transceiver. The electromagnetic shield is made of a soft magnetic alloy with a very high initial and maximum magnetic permeability, which has been fully hydrogen annealed to develop optimum magnetic shielding properties. In the preferred embodiment, this magnetic shielding material is sandwiched between two plastic reinforcing shells which allow very thin shielding materials to be used with little regard for their resistance to permanent deformation. The relatively high intrinsic electrical conductivity of the magnetic shielding material sufficiently simulates a Faraday cage to further shield a contactless smartcard/RFID tag from electric fields as well. Four embodiments for contactless smartcards as well as one for a military identification tag and one for a pill shaped RFID tag are presented.

13 Claims, 7 Drawing Sheets

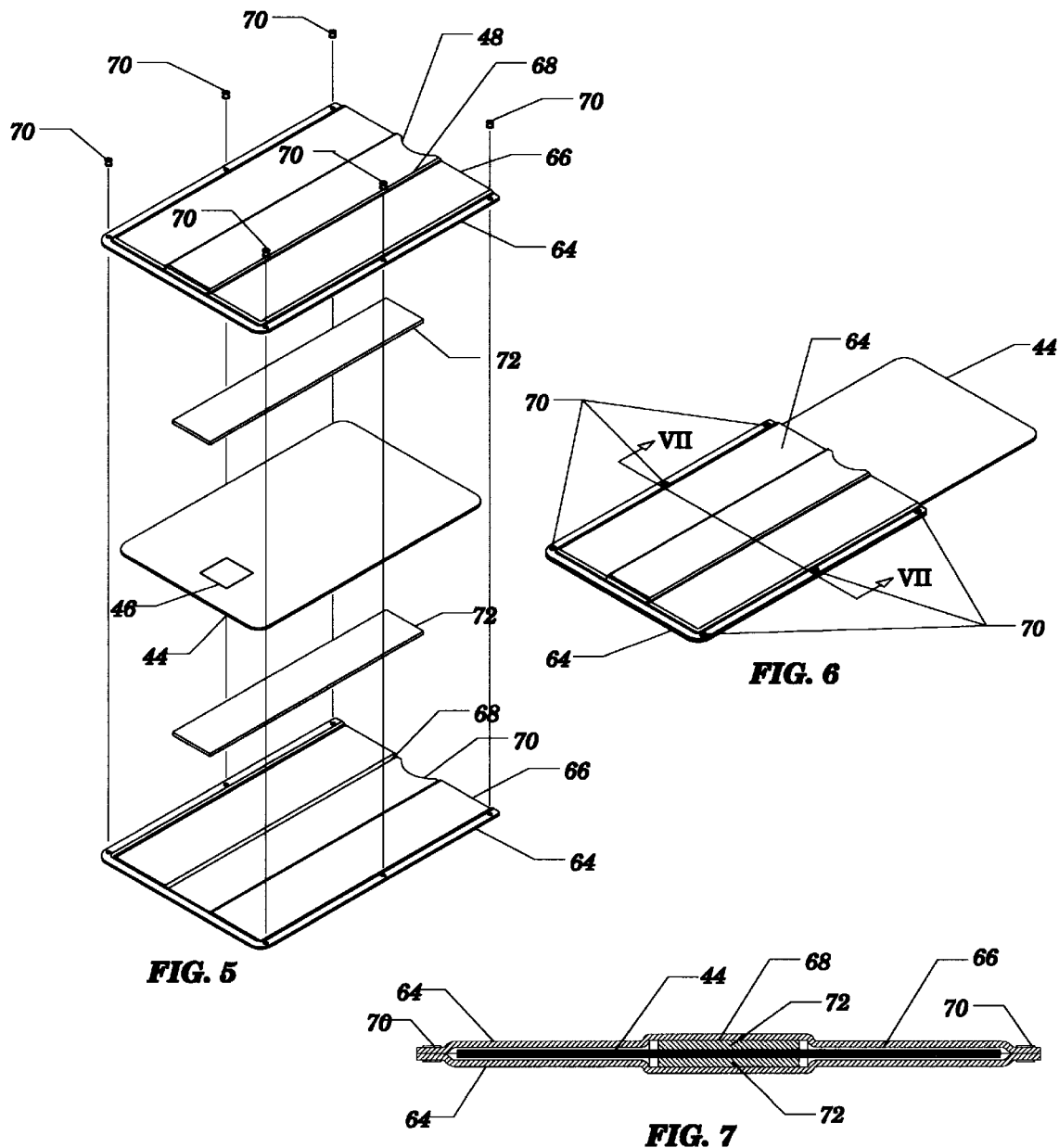

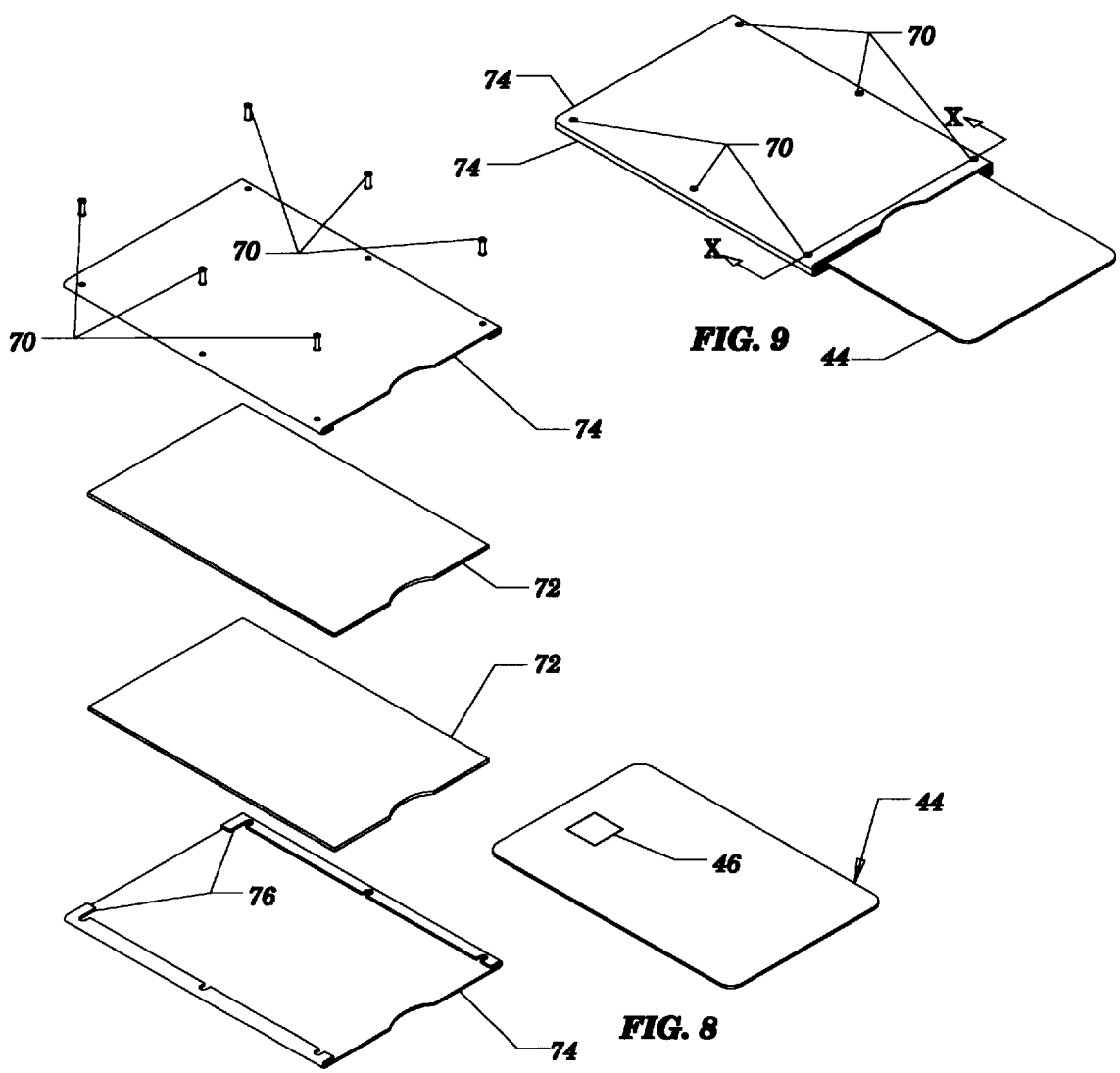

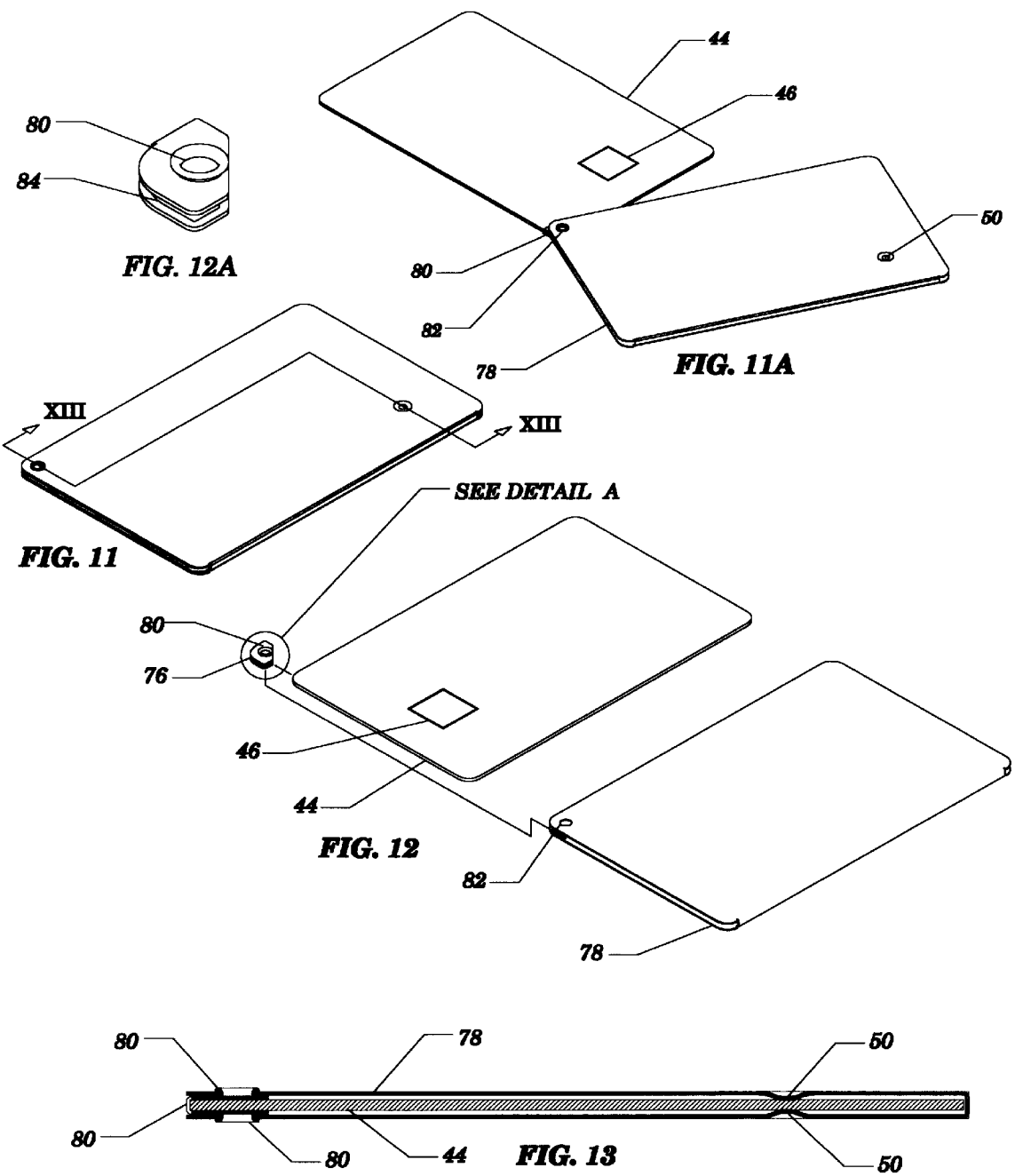

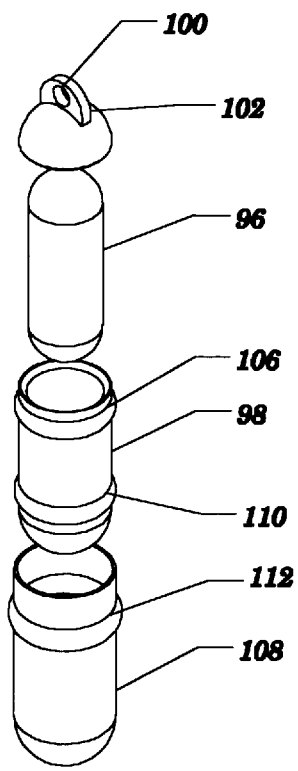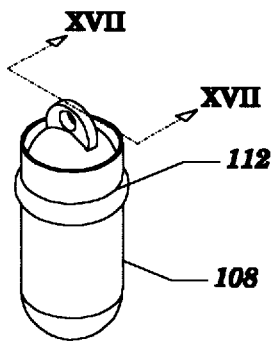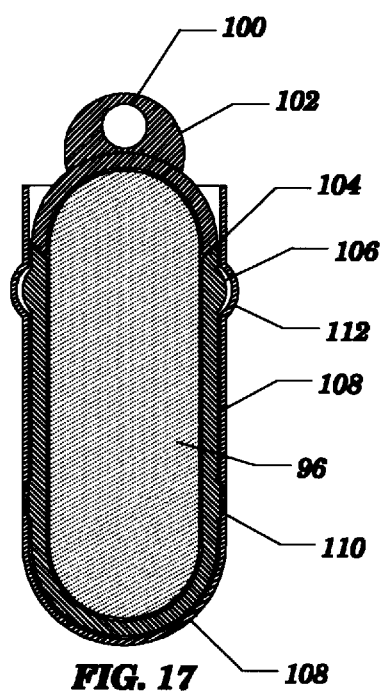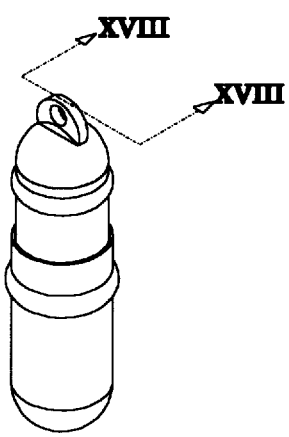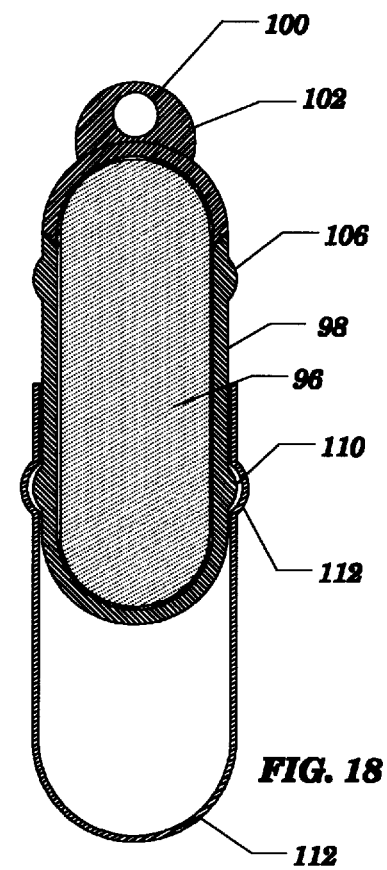
FIG. 15
FIG. 16
FIG. 17
FIG. 16A
FIG. 18

ELECTROMAGNETIC SHIELD TO PREVENT SURREPTITIOUS ACCESS TO CONTACTLESS SMARTCARDS

BACKGROUND—FIELD OF INVENTION

This invention relates to electromagnetic shields, specifically to such shields which are used to shield contactless smartcards or RFID microchips from electromagnetic radiation which imparts energy to power the smartcard/RFID chip and prevent the wireless exchange of digital data with a remote transceiver.

BACKGROUND—DESCRIPTION OF PRIOR ART

Contactless smartcards are credit card sized cards that are being marketed to consumers as an alternative to magnetic strip cards as a convenient vehicle for storing financial, health and other personal data. By virtue of their ability to store relatively large amounts of data on an embedded microchip, it is envisioned that these cards will eventually be used for all banking, transportation, healthcare, insurance, social security, welfare and other personal data.

Smartcards are expected to largely supplant other forms of information cards such as magnetic strip cards and contact smartcards primarily due to their convenience. Whereas magnetic strip cards and contact smartcards must come in physical contact with a reader, contactless smartcards can exchange information with a reader via magnetic, RF, infrared radiation or light. In the case of modulated magnetic or RF radiation, a contactless smartcard does not have to be removed from a persons wallet or purse for the smartcard to be powered up and an exchange of information to occur. Currently, an international standard has been established which sets a standard range of I meter between the reader and contactless smartcard. While magnetic strip and contact smartcards both reserve some form of physical deterrent to surreptitious access for the user, a contactless smartcard can be powered up and accessed without the card owner's knowledge.

The chips used in smartcards can be manufactured in a less sophisticated form called an RFID chip. The acronym RFID stands for Radio Frequency Identification. In their simplest form, these chips do nothing more than provide a means to remotely identify a person or object to which they are attached. These chips come in several different physical embodiments such as coin or pill shapes and are being installed in key rings, gambling chips and military dog tags for tracking and commerce applications. While RFID chips are generally less sophisticated than smartcards, they are still capable of being powered up and interrogated without the owner's knowledge or consent.

For several reasons, contactless smartcards do not typically have an embedded power source. First, most battery chemistries contain heavy and toxic metals. Since these cards will be routinely lost or discarded by their users, embedding a power source in the card would result in a very negative environmental impact. Second, these cards are projected to be manufactured by the billions worldwide. Any product that is produced in these sorts of numbers is extremely sensitive to manufacturing costs. Incorporating a battery into the card is simply too expensive. Therefore, the most common approach to providing power to the embedded chip is via a modulated magnetic field operating at an industry standard frequency of 125 KHz and a typical field intensity of 25 dB $\mu$A/m. This magnetic field induces a current in a loop antenna (U.S. Pat. No. 5,473,323 to Jreft, 1993) which is typically laminated as an internal layer of a smartcard. The embedded chip is routinely manufactured with on chip charge pumps and power regulation to provide different voltages to the various parts of the chip. Some RFID chips have the inductive loop built right onto the chip eliminating the need for any external antenna at all.

Although commercially produced contactless smartcard readers strive to achieve the industry standard range of 1 meter, it is entirely conceivable that a reader could be produced or modified to generate a much greater magnetic field strength and thereby increase the effective range of communication. If this transceiver were also equipped with a very sensitive receiver, the range and penetrating ability of the reader could be further enhanced. In that a contactless smartcard does not need to come in physical contact with the reader to exchange information, the user can no longer take a proactive role in securing the information on the card. The card owner must now rely entirely on software encryption or biometric techniques for security. The electromagnetic shield presented in this application returns the ability to proactively protect that information to the card owner There are two ways in which a shield can prevent the exchange of information between a contactless smartcard and the smartcard reader. The first and most effective method is to prevent the card from being powered up. The second is to shield the antenna from closing the RF link through the use of a conductive material such as metal that prevents RF signals from entering or escaping the inside of the shield. The problem with exclusively using the second approach is that the smartcard antenna can capacitively couple to the shield in such a way that the shield itself becomes an antenna. If a smartcard reader were equipped with a sensitive receiver, it is possible that the contents of the card could be accessed. The best way to prevent unapproved exchanges is to prevent the magnetic field generated by the reader from powering up the chip in the card.

Over the course of conducting a patent search for this application, no prior art was found that addressed the security problems of contactless smartcards through physical means such as a switch or shield. All of the relevant patents fell into two categories. The first category is that of shielded cardholders which prevent inadvertent damage to magnetic strip cards. It must be recognized that magnetic strip cards are not capable of contactless or wireless data exchanges, as are contactless smartcards or RFID chips. Magnetic strip cards do not have embedded microchips capable of RF communication and the users of such cards do not have a need for electromagnetic shielding to prevent surreptitious interrogation of their cards. Magnetic strip cards and contact smartcards must come in physical contact with a card reader in order for any information to be extracted from the card. At this point, it is beneficial to define some terms. A 'Contact Smartcard' has an embedded chip in it much like a 'Contactless Smartcard'. However, the Contact Smartcard interacts with the outside world via gold contacts on the outside of the card, whereas the Contactless Smartcard interacts with the outside world via modulated electromagnetic waves. A Contact Smartcard must physically touch the reader to exchange data. A Contactless Smartcard only needs to be within transmission range of a reader.

The second category of relevant patents concerns the use of software solutions, encryption techniques and biometrics. These patents propose using many different software techniques to prevent the card from being accessed by someone other than the card owner. In some cases, biometrics such as finger prints or retina scans built directly into the card are used to verify ownership of the card. These techniques may someday make contactless smartcards absolutely secure, but they all remove the power to control the information on the card from the card owner and place it in the hands of the card manufacturer. One of the distinguishing characteristics of the invention proposed in this patent is that it allows the cardholder to take complete responsibility for securing the information on the card. The shear number of software encryption schemes that are currently patented proves there is a need for and concern over the security of contactless smartcards. The fact that all of these techniques attempt to solve the security problem by means that are transparent to the user, makes it clear that these patents have not acknowledged the need or potential demand for a means of security that returns the control to the card owner. A more cynical view of these patents is that the card manufacturers are concerned that contactless smartcards will not enjoy widespread acceptance if the security issues are in plain sight. In this manner, this prior art has proven that the invention presented in this application solves a new and unrecognized problem.

It is the assertion of this patent application that software encryption techniques will prove to be inadequate over the long term due to the activity of unscrupulous, technically sophisticated 'hackers' that will compromise the various encryption techniques for nefarious or even entertainment purposes. As evidence to the truth of this statement, one only has to look to the very limited use of the Internet for credit card transactions and the criminal activity surrounding cloned cellular phones, phone cards and pagers. This current criminal behavior indicates there exists a strong monetary incentive to develop the ability to access and possibly change the contents of a smartcard. The enhanced storage capacity of these cards will make them candidates for storing all of ones financial, personal and healthcare data which makes these cards all the more valuable to criminals and heightens the importance of absolute security.

In the event that software encryption techniques, PIN numbers, biometrics and their ilk are successful in protecting the information on contactless smartcards, there is still another threat to the user's privacy that can not be addressed by these methods. There is currently an international effort to come to an agreement over public key access for governments; both domestic and foreign, to read the contents of a card through a 'backdoor' in the software. There are also several laws moving through Congress which will require that all encryption techniques must provide key access for the Government. Agencies such as the FBI, CIA and NSA are all very interested in gaining public key access to smartcards, cellular phones, pagers, modems, FAX and e-mail. The need for this access has arisen out of concern over the possibility of drug dealers moving large amounts of money across borders or international commerce taking place undetected. Airports have already begun to use contactless smartcard readers to surreptitiously track and log the movement of people through the terminals. While monitoring the activity of known criminals is an admirable goal and measuring commerce a necessary evil, many people will perceive this as an infringement of their right to privacy. Furthermore, if software keys exist, they will be very valuable and may eventually be used for unlawful activities.

Although software encryption, PIN numbers and biometrics strive to achieve the same results as the invention presented in this application, they are so different in their approach that they have not been presented in any detail here. Relevant patents describing magnetically shielded cardholders for magnetic strip cards have been presented in greater detail to acknowledge the similarities and articulate the differences with this invention.

U.S. Pat. No. 4,647,714 issued to Goto (1987) details an inexpensive composite material made of layers of paper or plastic coated with electrodeposited iron to provide magnetic shielding. Furthermore, several magnetic strip cardholders are illustrated. However, the stated goal of these cardholder is to protect the data stored on the magnetic strip from being inadvertently destroyed by stray magnetic fields produced by magnetic field sources such as televisions and speakers. The protective shielding effect was also expanded to other magnetic data storage vehicles such as floppy discs.

U.S. Pat. No. 5,288,942 issued to Godrey and Westfield (1994) describes a similar invention using two thin sheets of soft ferromagnetic material which act as 'keepers' for the data stored in the form of magnetic patterns on the magnetic strip of magnetic strip cards. The soft ferromagnetic material in this invention can take the form of metal foil or powders added to molded plastic resins. The In the event that software encryption techniques, PIN numbers, biometrics and their ilk are successful in protecting the information on contactless smartcards, there is still another threat to the user's privacy that can not be addressed by these methods. There is currently an international effort to come to an agreement concerning key access for governments or "Trusted Third Parties" as they are referred to. These laws and agreements would provide access to governments; both domestic and foreign, to read the contents of a card through a 'backdoor' in the software. There are also several laws moving through Congress which will require that all encryption techniques must provide key access for the Government. Agencies such as the FBI, CIA and NSA are all very interested in gaining public key access smartcards, cellular phones, pagers, modems, FAX and e-mail. The need for this access has arisen out of concern over the possibility of drug dealers moving use of low conductivity powders and non-conductive binders indicates there is no concern for shielding RF electromagnetic radiation. Indeed there is no reason for concern since magnetic strip cards are incapable of contactless operation. This invention is very similar to and strives to produce the same results as the aforementioned U.S. Pat. No. 4,647,714.

U.S. Pat. No. 5,360,941 issued to Roes (1994) and assigned to Cubic Automatic Revenue Collection Group describes an electrostatic shield to protect the microchip embedded in a smartcard while simultaneously allowing communication to occur between the card and the reader. This shield is an integral part of the card and its stated purpose is to completely shield the chip from the effects of electrostatic potential accumulations and discharges while being receptive to alternating magnetic fields. This shield does not give the user any control over when a data exchange takes place. It merely protects the chip from electrostatic damage and strives to allow communication with the chip to occur unabated.

Another category of prior art includes bankcard holders, which only protect the card from physical damage. U.S. Pat. No. 5,125,505 (1992) describes a novel cardholder that ejects the card when a button is pushed. U.S. Pat. No. 5,020,255 (1991) describes a cardholder in which the card is inserted and removed manually and is retained by a snap catch. U.S. Pat. No. 4,674,628 (1987) describes a similar holder which is incorporated into a key ring and is capable of holding several cards. U.S. Pat. Nos. 5,080,223 and 4,697,698 both describe cardholders that hold several cards, which can be individually removed. What all of these patents have in common is that their preferred embodiments are made of injection molded plastic parts which are incapable of shielding against magnetic fields. U.S. Pat. No. 5,337,813 (1994) does mention protecting the magnetic strip on a magnetic strip card from physical damage but it is not concerned with protecting the information stored on that strip from the effects of stray magnetic fields. It is arguable that these patents can not be considered prior art to this application since none of them are concerned with the electromagnetic shielding properties of the materials they are made of.

Many patents were found which described composite magnetic shielding material. None of these patents specified using these materials to protect smartcards or RFID chips from surreptitious interrogation. Another broad category of patents concerned different shielding approaches for communications equipment such as cellular phones or pagers. These shielding techniques are always an integral part of the construction of the product and are intended to isolate a communications device from its environment so that its performance will not be negatively affected by its surroundings and vice versa. Many of these patents are very narrow in their scope so as to give their assignees a competitive advantage in their current market.

OBJECTS AND ADVANTAGES

Accordingly, several objects and advantages of the Electromagnetic Shield to Prevent Surreptitious Access to Contactless Smartcards described above are:

(a) to provide a contactless smartcard owner a method to proactively protect the information stored on their card from unauthorized access by means other than software encryption/protection or biometrics through the use of an electromagnetic shield which totally or partially encloses the card and sufficiently prevents magnetic fields from inducing a current in the contactless smartcard's antenna and communicating with a smartcard reader via any form of electromagnetic radiation (magnetic, RF, infrared, microwave, light, etc.);

(b) to prevent a contactless smartcard owner from being tracked, logged and time stamped against his/her will through a surreptitious query of the cards contents and ownership by a 'trusted third party' such as a domestic or foreign government in possession of a public key access provided to them by the originators of the particular encryption technique used by the smartcard manufacturer and/or service provider;

(c) to prevent a contactless smartcard from being powered up by a modulated magnetic field without the card owners consent through the use of a magnetic shield which totally or partially encloses the card and is made of a high nickel content alloy metal characterized by a high initial and maximum permeability and heat treated to fully develop its magnetic shielding properties. This material is commonly known as Permalloy or Mu-Metal;

(d) to prevent the unauthorized exchange of information between a contactless smartcard and a smartcard reader through the use of an electrically conductive shield which totally or partially encloses the card and blocks the transmission and reception of any form of electromagnetic radiation;

(e) to protect the integrity of data stored on the card when the card is being used primarily for data storage and transportation instead of as a tool of trade or commerce;

(f) to protect the card from physical damage such as scratches, bending or breakage so as to preserve any intrinsic value it may have as a collectible item;

(g) in its preferred embodiment, to reinforce the mechanically soft and ductile shield material with an outer plastic case and in doing so, reduce the required thickness and cost of the relatively expensive shield material;

(h) To allow the cardholder to be manufactured in different colors and shapes by encasing the metal shield material in plastic.

Further objects and advantages of my invention in its preferred embodiment are that the two halves of the plastic case are identical and able to be manufactured with one relatively inexpensive injection mold tool free of any lateral slides. These two halves can be quickly, efficiently and cleanly assembled by ultrasonic welding. Alternatively, the metal shield could be overmolded into the plastic case thereby eliminating all manual assembly. Still further objects and advantages will become apparent from a consideration of the ensuing description and drawings.

DRAWING FIGURES

FIG. 5 is an exploded isometric drawing of a second embodiment, which uses two identical lightly drawn shields made of magnetic shielding material to form a shielded cavity for the smartcard. Two strips of adhesive backed velvet are applied to the inside surfaces of the reinforcing ribs and the smartcard is shown in a shielded position.

FIG. 6 is an isometric drawing of the fully assembled shield cardholder with the smart card inserted half way into the shield.

FIG. 7 is an enlarged sectional view showing a slight interference between the smartcard and the adhesive backed velvet serving as a card retention feature.

FIG. 8 is an exploded isometric drawing of a third embodiment which uses two identical hem edged shields and two pieces of adhesive backed velvet to form a shielded enclosure. A contactless smartcard is shown outside of the enclosure and in a position to be inserted.

FIG. 9 is an isometric view of the third embodiment fully assembled and illustrates how a contactless smartcard is inserted into the magnetically shielded enclosure.

FIG. 10 is an enlarged cross sectional view of the third embodiment.

FIG. 11 is an isometric view of a fourth embodiment, which uses a pivoting shield. The contactless smartcard is not visible in this view, as it has been pivotably inserted into the pivoting magnetic shield.

FIG. 11A is an isometric view of the contactless smartcard pivoted out of the shield and capable of communicating with a smartcard reader.

FIG. 12 is an isometric exploded view showing how the plastic snap is first assembled to one corner of the contactless smartcard and then snapped into the pivot holes through the corners of the pivoting magnetic shield.

FIG. 12A is an enlarged isometric view of the plastic snap highlighting the pressure sensitive adhesive on the internal surfaces as the means of attachment to the contactless smartcard.

FIG. 13 is an enlarged sectional view detailing how the plastic snap assembles to the pivoting magnetic shield and two dimples in the pivoting magnetic shield which serve as card retention features.

FIG. 15 is an exploded isometric view of a sixth embodiment which consists of a plastic encased, pill shaped RFID tag with a pill shaped magnetic shield.

FIG. 16 is an isometric view showing the plastic encased, pill shaped RFID tag inserted down into the pill shaped magnetic shield thus preventing communication.

FIG. 16A is an isometric view showing the plastic encased, pill shaped RFID tag pulled out of the pill shaped magnetic shield thus allowing communication.

FIG. 17 is an enlarged sectional view of the sixth embodiment in a shielded configuration. The upper retention lip fits into the detent of the pill shaped magnetic shield to hold it in this position.

FIG. 18 is an enlarged sectional view of the sixth embodiment in an unshielded configuration. The lower retention lip fits into the detent in the pill shaped magnetic shield to hold it in this position.

Figure 1A:
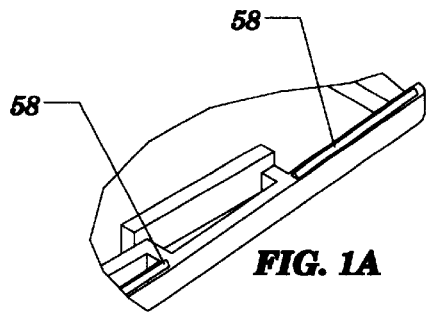
FIG. 1A shows a detail of an ultrasonic energy concentrator that melts to form a bond between the two plastic reinforcing shells and hold the entire assembly together.

| Reference Numerals in Drawings | |
| --- | --- |
| 40 plastic reinforcing shell | 42 magnetic shielding material |
| 44 contactless smartcard | 46 embedded smartcard microchip |
| 48 finger pull | |
| 52 reinforcing capture lip | 50 card retention feature |
| 56 slot | 54 retention slot |
| 60 capture tab | 58 ultrasonic energy concentrator |
| 64 lightly drawn shield | |
| 68 reinforcing rib | 62 shield capture boss |
| 72 adhesive backed velvet | 66 thin enclosed area |
| 76 card stop | 70 eyelets |
| 80 plastic snap | 74 hem edged shield |
| 84 pressure sensitive adhesive | 78 pivoting shield |
| 88 military identification tag | 82 pivot holes |
| 92 slot | 86 coin shaped RFID tag |
| 96 pill shaped RFID tag | 90 chain hole |
| 100 key ring hole | 94 connecting web |
| 104 ultrasonic weld or | |

| -continued | |
| --- | --- |
| Reference Numerals in Drawings | |
| solvent bond | 98 protective plastic case |
| 108 pill shaped magnetic shield | 102 plastic cap |
| 112 detent | 106 upper retention ring |
| | 110 lower retention ring |

DESCRIPTION-FIGURES 1 to 18

Figure 1:
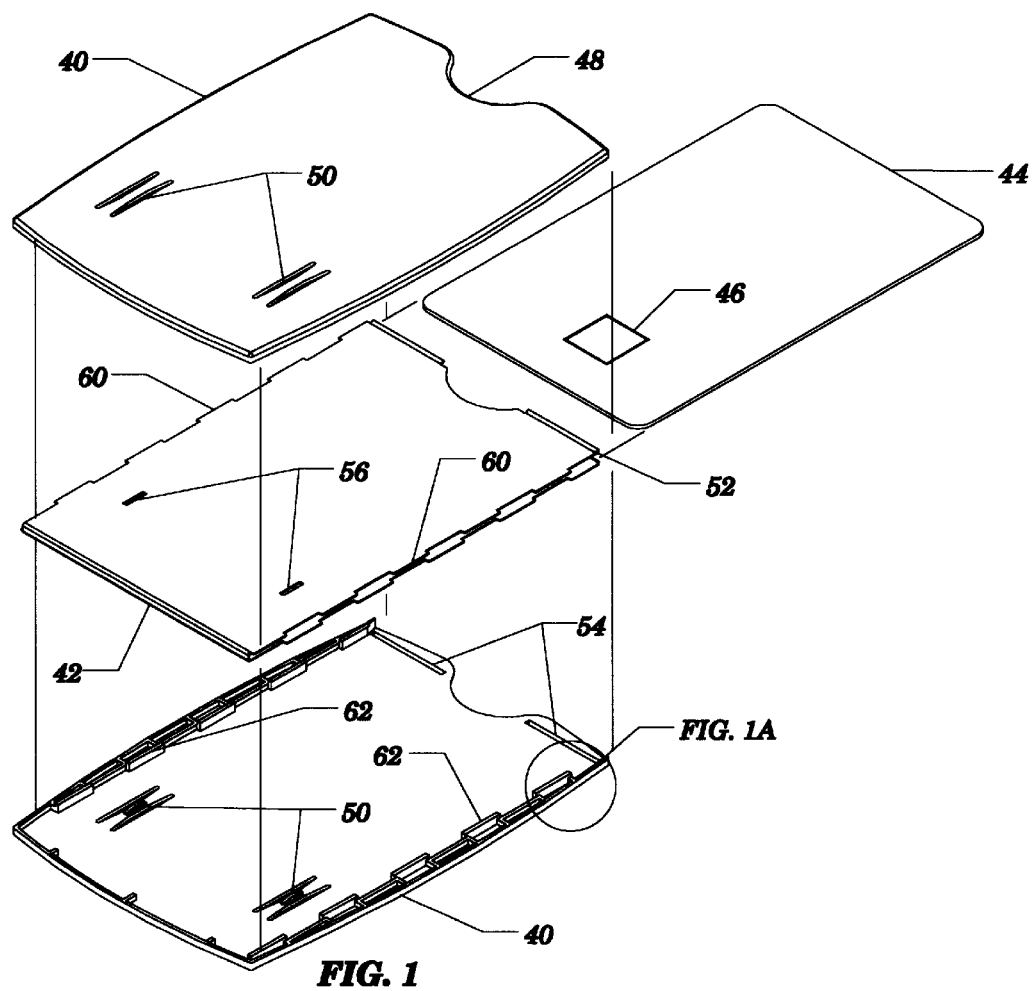
FIG. 1 shows an exploded isometric view of the top and bottom identical plastic reinforcing shells, which support the internal magnetic shielding material. A contactless smartcard is shown in a position before insertion between the adjacent plates of the magnetic shielding material.
Figure 2:
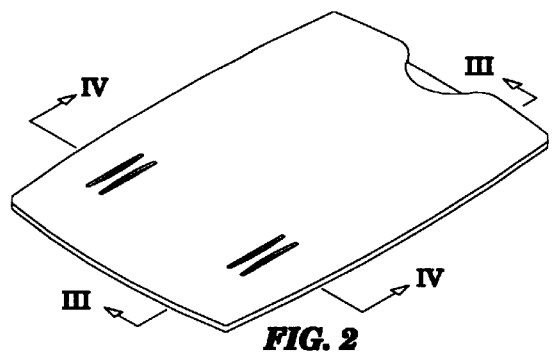
FIG. 2 is an isometric view of the fully assembled, magnetically shielded cardholder.

The preferred embodiment of this invention is illustrated in FIGS. 1, 1A, 2, 3, 3A, 4 and 4A. FIG. 1 is an exploded isometric showing how the shield is assembled. The assembly includes two identical plastic reinforcing shells 40, which encase the magnetic shielding material 42 when attached to one another. The smartcard 44 with its embedded smartcard microchip 46 is inserted into the open end of the magnetic shield and can be easily removed by grasping the smartcard 44 through the finger pull 48. FIG. 2 shows the fully assembled cardholder with the contactless smartcard 44 fully inserted into the magnetic shielding material 42 sandwiched between the two plastic reinforcing shells 40. These plastic reinforcing shells 40 are preferably made of a plastic resin that is well suited to ultrasonic welding or solvent bonding and is also impact resistant and capable of producing a cosmetically appealing part. These plastic reinforcing shells 40 support the magnetic shielding material 42 so that it does not bend and take a permanent set when deflected. The plastic reinforcing shells 40 allow a thinner gage of magnetic shielding material 42 to be used (~0.010") and eliminates the need for costly metal finishing processes. Alternatively, the magnetic shield 42 could be overmolded into the plastic case thus eliminating any assembly. The plastic reinforcing shells 40 also allow the cardholder to take on different shapes and colors to improve its cosmetic appeal. FIG. 1A shows an isometric detail of small, narrow protrusions called ultrasonic energy concentrators 58, which are spaced around the perimeter of the reinforcing plastic shells 40. The spacing of the ultrasonic energy concentrators 58 is such that they fall between one another when the two reinforcing plastic shells 40 are mated together allowing the same part to be used for each side. These protrusions concentrate the energy delivered to the assembly by an ultrasonic horn and melt to form a permanent bond between the two reinforcing plastic shells 40 and captivate the magnetic shield 42.

The magnetic shielding material 42 is made of a thin sheet of a soft magnetic metal alloy (~0.010") characterized by a very high initial and maximum magnetic permeability and corresponding high attenuation. These types of metals have many different trade names, but they are commonly known as Permalloy 80 or MuMetal® (available from Spang Specialty Metals, Butler, Pa). This metal typically contains as much as 80% Nickel with the remainder being mostly iron, molybdenum, chromium or copper. The magnetic shielding material 42 must be heat treated to fully develop its shielding properties in Hydrogen at 1121° C. for at least 4 hours and then cooled to 600° C. at a rate no greater than 222° C./hour after which it can be air cooled to room temperature. This heat treating process can be done before or after the magnetic shielding material 42 is stamped and formed, however, fully annealed material is difficult to stamp. It is critical to the performance of the magnetic shielding material 42 that the two opposing leaves of the shield be electrically connected so as to provide a continuous path for external magnetic fields.

The magnetic shielding material 42 specified above has a high intrinsic electrical conductivity and is therefore extremely effective at shielding electric fields as well as magnetic fields. Materials such as MuMetal® are capable of preventing wireless communication between a contactless smartcard 44 and a remote transceiver by simulating a Faraday cage for the smartcard. However, shielding the card from electric fields is unreliable since the loop antenna in the contactless smartcard 44 can couple with the magnetic shielding material 42 and become an antenna itself. Although the shielding effect obtained from materials such as Permalloy and MuMetal® provides protection from both magnetic and electric fields, shielding the contactless smartcard from magnetic fields is considered the primary goal of this invention.

The magnetic shielding material 42 is endowed with three separate features that captivate it inside of the reinforcing plastic shells 40. First, there are capture tabs 60 which fit in between shield bosses 62 molded into the reinforcing plastic shells 40. FIG. 1 shows five of these shield bosses 62 running along each side of the plastic reinforcing shells 40. These bosses are also spaced so that they fit in between each other when assembled and simultaneously fix the capture tabs 60 in three mutually perpendicular planes. This capture is best shown in the sectional views of FIGS. 4 and 4A.

Figure 3:
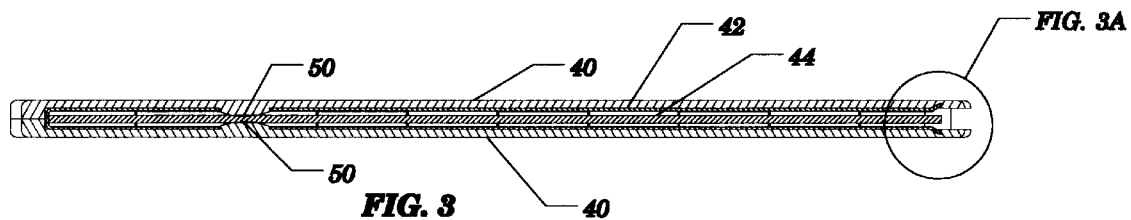
FIG. 3 is a sectional view of the cardholder showing details of an interference between the smartcard and the card retention features of the plastic reinforcing shells.
Figure 4:
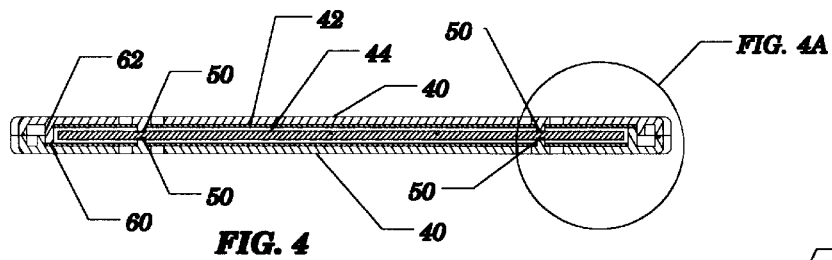
FIG. 4 is a sectional view of the magnetically shielded cardholder detailing the interference between the smartcard and the card retention features in the plastic reinforcing. This sectional view also shows the shield capture bosses of the plastic reinforcing shells interleaving and pressing against the capture tabs of the magnetic shielding material.
Figure 3A:
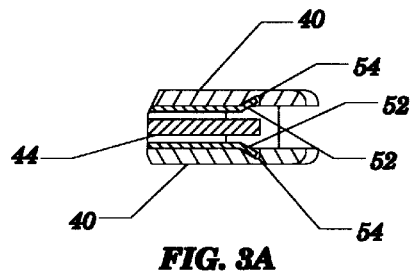
FIG. 3A shows an enlarged cross sectional detail of the reinforcing capture lip retained by retention slots in the plastic reinforcing shells.
Figure 4A:
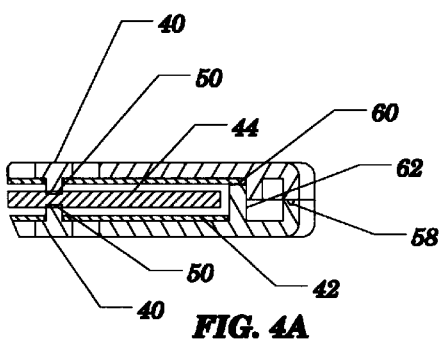
FIG. 4A is an enlarged sectional view of the capture tabs of the magnetic shielding material being captivated by the shield capture bosses.

The second feature that retains the magnetic shield 42 in the plastic reinforcing shells 40 is the reinforcing capture lips 52 shown in FIGS. 3 and 3A. These lips serve to reinforce the edge of the magnetic shield 42 so it can withstand moderate flexing without interfering with the insertion and removal of the smartcard. These reinforcing capture lips 52 fit into retention slots 54 in the reinforcing plastic shells. The retention slots are shaped to receive the reinforcing capture lips and prevent them from slipping out and damaging the smartcard during insertion.

The third feature that captivates the magnetic shield 42 in the reinforcing plastic shells are the two card retention features 50 shown in FIGS. 1, 3, 4 and 4A. These features interfere slightly with the smartcard 44 and deflect when the contactless smartcard 44 is inserted in between the two leaves of the magnetic shield 42 thus retaining the contactless smartcard 44 through light friction between the card and the card retention features 50. The card retention features 50 protrude through slots 56 and prevent it from sliding out of the open end of the assembled plastic reinforcing shells 40. These ramps are strain relieved by two strain relief slots on both sides and running parallel to their longest dimension. These card retention features 50 can deflect enough to accommodate the narrow range of standard thickness contactless smartcards 44 as well as any embossed text.

Additional embodiments are shown in FIGS. 5, 6, 7, 8, 9, 10, 11, 11A, 12, 12A, 13, 14, 14A, 15, 16, 16A, 17 and 18. In each of these designs, a thin sheet of magnetic shielding material characterized by high initial and maximum magnetic permeability surrounds the smart card or RFID chip so that the shield is formed of a single piece of metal, or the different pieces of the shield are in physical and electrical contact with one another. In all of the embodiments, the primary benefit of this invention is attained when the contactless smartcard 44 or RFID tag 86, 96 is inserted into the magnetic shielding material 42 and is completely or sufficiently shielded from external magnetic fields capable of powering the embedded smartcard microchip 46.

FIG. 5 is an exploded isometric view of the second embodiment of this invention, which uses two identical, lightly drawn shields 64, which are held together with eyelets 70. These two lightly drawn shields 64 form a shielded enclosure with two enclosed thicknesses as shown in FIG. 7. The thin enclosed area 66 is slightly wider than the thickness of the international standard for a bankcard or contactless smartcard 44 thus allowing it to slide freely in and out of the shield. The contactless smartcard 44 is prevented from unexpectedly sliding out of the shield by two card retention features 50 in the form of adhesive backed velvet strips 72 that are applied to the inside of the surface of the reinforcing rib 68 of the lightly drawn shields 64 (Adhesive backed imitation velvet is available from C. W. Fifield Co., Inc., Hingham, Mass.). The nap of the velvet on the card retention features 50 is in slight interference with the surfaces of the contactless smartcard 44. FIG. 6 is an isometric drawing of the fully assembled shield demonstrating the insertion of the contactless smartcard 44. As the card is inserted into the shield, the individual hairs of velvet bend in the direction of insertion and collectively grip the surface of the contactless smartcard 44 thus preventing it from inadvertently slipping out of the shield. The contactless smartcard 44 is removed by gripping through the finger pulls 48 on the lightly drawn shields and pulling outward with enough force to overcome the grip of the nap on the velvet card retention features 50. Another advantage of applying the adhesive backed velvet card retention features 50 to the recessed surface of the reinforcing rib 68 is that the contactless smartcard 44 can not catch on the edge of the velvet during insertion and degrade the adhesive bond between the adhesive backed velvet strips 72 and the reinforcing rib 68. The reinforcing rib 68 and the thin enclosed area 66 combine to lend strength to the shield by increasing the cross sectional moment of inertia so that it does not bend or distort when carried in a soft container such as a wallet, purse or pocket.

FIG. 8 is an exploded isometric view of the third embodiment of this invention. Two identical hem edged shields 74 are held together with eyelets 70. Two pieces of die cut adhesive backed velvet 72 serve as the card retention feature 50 in this embodiment and are applied to the inner surface of each hem edged shield 74 in between the hems (adhesive backed, imitation velvet is available from Fifield Incorporated). FIG. 9 is an isometric view of the fully assembled shield illustrating how the contactless smartcard 44 is inserted into the shield. As in the second embodiment, there is a slight interference between the nap of the velvet and the contactless smartcard 44. As the contactless smartcard 44 is inserted into the shield, the individual hairs of velvet bend in the direction of insertion and collectively grip the surface of the contactless smartcard 44 thus preventing it from inadvertently slipping out of the shield. The contactless smartcard 44 is removed by gripping through the finger pulls 48 on the hem edged shields 74 and pulling outward with enough force to overcome the grip of the die cut adhesive backed velvet strips acting as the card retention features 50. A card stop 76 is provided on the hem edged shields 74 to prevent the card from being inserted too deep into the shield. The hemmed edges of individual shields provide excellent shielding as well as structural reinforcement for the entire assembly so that it does not bend or distort when carried in a soft container such as a wallet, purse or pocket. Although this embodiment is very similar in construction to the second embodiment, this design has exceptionally low associated tooling costs and makes very efficient use of material. The magnetic shielding material 42 is relatively expensive and any waste adds to the cost of the final product.

FIG. 11 is an isometric view of the fully assembled fourth embodiment of this invention. In this figure, the contactless smartcard 44 is not visible because it has been pivotably inserted into the pivoting shield 78 thus preventing any communication with a smartcard transceiver. In FIG. 11A, the contactless smartcard 44 has been rotated out of the pivoting shield 78 and is now capable of communicating with a smartcard transceiver. Since the International Standard for smartcards does not specify a small hole in the corner of the card that could be used as a pivot point for such an invention, a plastic snap 80 is used here to provide a means of securing the pivoting shield 78 to the contactless smartcard 44. FIG. 12 is an exploded isometric view showing the plastic snap 80 first attached to the corner of the contactless smartcard 44 by means of a pressure sensitive adhesive 84. The two large surfaces of the pivoting shield are then spread slightly so that the snap can slide in between them and line up with the pivot hole 82 punched in the pivoting shield 80. The pivot holes 82 are then snapped over the plastic snap 80 and the shield is ready for use. When the contactless smartcard 44 is rotated into the pivoting shield 78, it is held in place by two opposing dimples in the pivoting shield 78 which interfere slightly with the surfaces of the contactless smartcard 44 and serve as the card retention features 50 for this embodiment. This interference is best shown in the sectional view of FIG. 13. The advantage of using the adhesive attaches plastic snap 82 is that it eliminates the need to drill a hole in the corner of the card. Such a hole would require the card owner to possess and use tools, accurately locate the hole, would risk destroying the inductive loop/antenna in the card and would certainly diminish any value the card has as a collectible item. This embodiment makes very efficient use of the magnetic shielding material and requires no assembly by the manufacturer.

Figures 14, 14A:
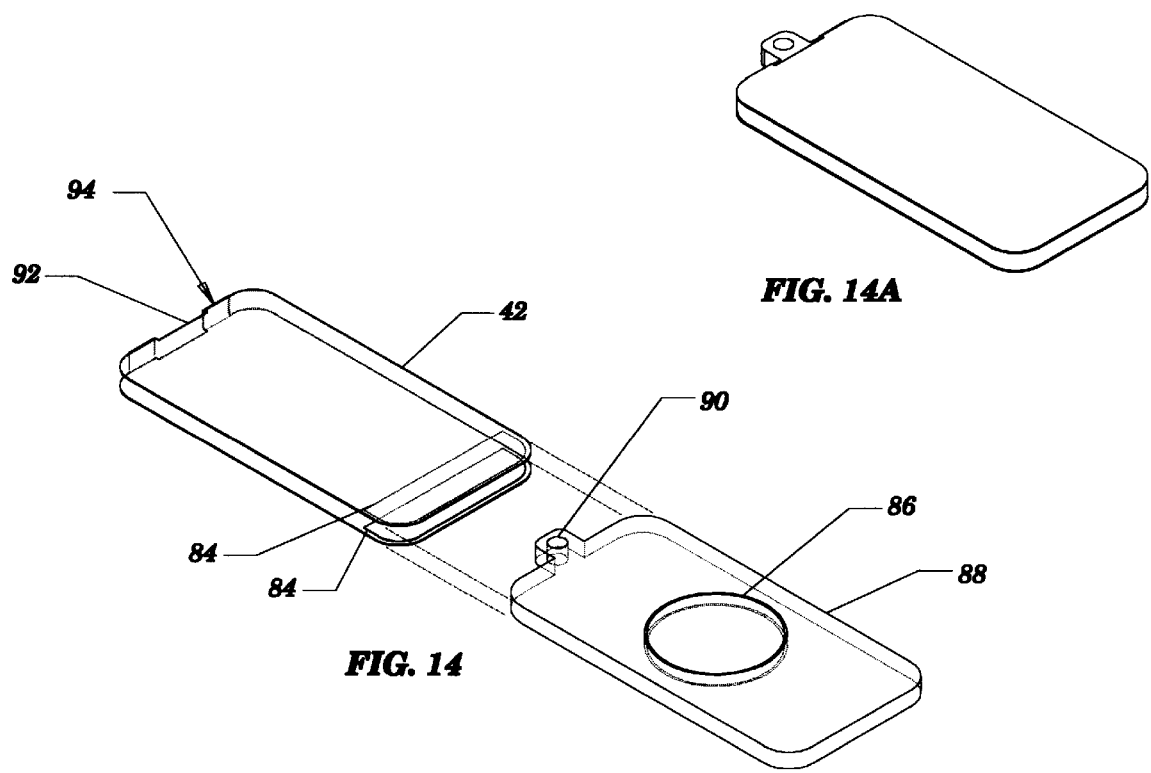
FIG. 14 is an exploded isometric drawing of a fifth embodiment showing how a thin magnetic shield can be applied to a military identification tag to block communication with a coin shaped embedded RFID tag.
FIG. 14A is an isometric view of a magnetically shielded military identification tag with an embedded coin shaped RFID tag.

FIG. 14 is an exploded isometric view of the fifth embodiment of this invention. This embodiment is aimed at shielding a coin shaped RFID tag 86 instead of a contactless smartcard 44. Specifically, this embodiment addresses the need to occasionally shield the RFID tag 86 now being placed in the 'Dog Tags' of military personnel. RFID tags come in several shapes and sizes. Some are coin shaped, pill shaped or patch shaped. FIG. 14 shows a Military Identification Tag 88 with a coin shaped, embedded RFID tag 86. The chain that goes through the chain hole 90 in the military identification tag 88 and is used to hold this tag around the necks of military personnel is fed through the slot 92 in the magnetic shielding material 42. Pressure sensitive adhesive 84 serves as the retention feature in this embodiment and is applied to the inside surface of the magnetic shielding material 42 to secure the magnetic shielding material 42 to the military identification tag 88. If the magnetic shielding material 94 is supplied as a reusable item with a snap on or slide on attachment, the soldier's name, rank and serial number can be embossed into the magnetic shielding material 42 so that this information is still visible when the shield is covering the military identification tag 88. The connecting webs 94 provide electrical conductivity between the adjacent leaves of the magnetic shielding material 42. FIG. 14A is an isometric view of the fully assembled, shielded military identification tag.

FIG. 15 is an exploded isometric view of another embodiment of this invention that shields a pill shaped RFID tag 96 that is enclosed in a protective plastic case 98. This particular embodiment has been marketed by a major oil company as a fast and convenient RFID tag, which can be attached to a key ring by the key ring hole 100 to identify an individual buying gasoline. The pill shaped RFID tag 96 is completely encased in plastic by fixing a plastic cap 102 onto the protective plastic case by ultrasonic welding or a solvent bond 104. The protective plastic case 98 has two annular rings molded into it. The one closest to the open end of the protective plastic case 98 is called the upper retention ring 106 and holds the pill shaped magnetic shield 108 in a position that shields the pill shaped RFID tag 96 from external magnetic fields. FIG. 16 is an isometric view showing the pill shaped RFID tag 96 in the shielded position. FIG. 17 is a sectional view showing greater detail of the same shielded position. The second annular ring on the protective plastic case 98 is the lower retention ring 110. The lower retention ring 110 holds the pill shaped magnetic shield 108 in a position where the pill shaped RFID tag 96 is exposed and able to communicate with a transceiver. FIG. 16A is an isometric view showing the pill shaped RFID tag 96 in the exposed position ready to communicated with a transceiver. FIG. 18 is a sectional view showing greater detail of the same position. In both positions, detents 112 in the pill shaped magnetic shield 108 grasp the upper and lower retention rings 106,110.

SUMMARY, RAMIFICATIONS, and SCOPE

Accordingly, the reader will see that the electromagnetic shield to prevent surreptitious access to contactless smartcards and RFID tags presented can be used to give control over access to the contents of a contactless smartcard or RFID tag to the card owner. The card owner does not have to rely on manufacturer based software or biometric security techniques or the integrity of 'Trusted Third Parties' to insure and respect the card owner's right to privacy. Furthermore, this magnetic shielding technique has the additional advantages in that

- A contactless smartcard or RFID tag is protected from surreptitious wireless communication by the intrinsic electric field shielding capabilities of the magnetic shielding material as well as its magnetic shielding properties;
- The preferred embodiments shape, color and ancillary features can be changed on an ongoing basis to meet the tastes and demands of the present day market;
- The natural corrosion resistance of the high nickel content, soft magnetic alloys specified eliminate the need for further surface treatments to prevent corrosion;
- The strength of the plastic reinforcing shells and magnetic shielding material in combination with the velvet lining protect the smartcard from physical damage and help preserve any future value the card may have as a collectible item;
- The market for contactless smartcards and RFID tags could be expanded by this invention by assuaging the card owner's concerns over security and privacy by giving them the ability to proactively limit and control when and where the information stored on the card is accessed or changed;

Although the description above contains many specificities, these should not be construed as limiting the scope of the invention but as merely providing illustrations of some of the presently preferred embodiments of this invention. For example, the plastic reinforcing shells could be optimized to reduce weight while maximizing their structural integrity. The card retention features in the plastic shells could take on many different forms and locations as well as the method by which the magnetic shield is captivated in the plastic shells. The military identification tag shield is a fairly specific ramification, however, the method of attachment to the tag could take on a myriad of forms. The shield could be permanently mounted to the tag so that it slides up and down in slots molded into the tag. Alternatively, the shield could rotate out of place as in the pivoting shield embodiment. The pill shaped RFID tag has certainly already found many more applications besides the one illustrated in embodiment 6, but this one was given as an example because it was the most current and public application as of this writing.

Thus the scope of this invention should be determined by the appended claims and legal equivalents, rather than by the examples given.

INDUSTRIAL APPLICABILITY

Users of magnetic strip bankcards and contact smartcards have heretofore enjoyed the capability of controlling when and where the contents of their cards are accessed. Contactless smartcards, with their ability to be remotely powered by modulated magnetic fields and surreptitiously accessed even though the card may still remain in the user's wallet or purse, leave the user utterly dependent upon software or biometrics for the security of the contents of the card. Furthermore, given the international effort to gain public key access to smartcards for 'Trusted Third Parties' such as the United States Government and foreign governments, contactless smartcard users will be forced to trust that these governments, both domestic and abroad, to not abuse their ability to access the contents of the card at will. Given that contactless smartcards are being targeted to manage all aspects of a user's life including personal, financial, health and welfare information, the need to proactively protect the contents of the card should insure widespread use and acceptance.

I claim:

1. A means for shielding at least one contactless smartcard or RFID tag from external magnetic fields which can result in surreptitious, wireless communication between the contactless smartcard or RFID tag and a remote transceiver comprising:

at least one sheet of magnetic shielding material shaped to substantially surround the at least one contactless smartcard or RFID tag and characterized by a high initial and maximum magnetic permeability, contiguous electrical conductivity of any two points on said at least one sheet of magnetic shielding material, and sufficient thickness to reduce the magnetic field strength inside of the space enclosed by said at least one sheet of magnetic shielding material below the threshold required to induce a sufficient amount of power in a microchip embedded in the contactless smartcard or RFID tag and result in wireless communication between the contactless smartcard or RFID tag and a remote transceiver not in physical contact with the contactless smartcard or RFID tag;

a pair of plastic reinforcing shells which physically hold the at least one contactless smartcard or RFID tag temporarily and securely within the magnetic shielding material; and said at least one sheet of magnetic shielding material being formed into a U-shape with a plurality of capture tabs along the edges thereof, said plurality of capture tabs being sized to fit into a plurality of shield capture bosses in each plastic reinforcing shell, said pair of plastic reinforcing shells retaining said magnetic shielding material.

2. The means for shielding of claim 1, wherein said at least one sheet of magnetic shielding material having at least one slot formed therethrough, at least one card retention feature being formed in each said plastic reinforcing shell, said card retention feature extending through said at least one slot, said at least one card retention feature providing a frictional means for holding the contactless smartcard in a position sandwiched inside of said at least one sheet of magnetic shielding material.

3. The means for shielding of claim 1, wherein said at least one sheet of magnetic shielding material is comprised of a soft magnetic alloy heat treated to fully develop its magnetic shielding properties in a hydrogen atmosphere.

4. The means for shielding of claim 1, wherein
said pair of reinforcing plastic shells is injection molded from a plastic resin which is conducive to ultrasonic welding techniques, in an asymmetrical shape so that said reinforcing plastic shell can be assembled to itself by ultrasonic welding wherein, a thin cavity is formed sandwiching said at least one sheet of magnetic shielding material between said pair of reinforcing plastic shells.

5. The means for shielding of claim 1, wherein
said at least one sheet of magnetic shielding material is made of a high nickel content alloy with sufficient electrical conductivity to shield said at least one contactless smartcard or RFID tag from electric fields.

6. A device for shielding at least one contactless smartcard or RFID tag from an external magnetic field, comprising:

a reinforcing structure being a pair of non-conductive reinforcing shells;

at least one sheet of magnetic shielding material being shaped to substantially surround said at least one contactless smartcard or RFID tag, said magnetic shielding material having a high initial and maximum magnetic permeability, said magnetic shielding material reducing the strength of the external magnetic field to prevent communication between the at least one contactless smartcard or RFID tag and a remote transceiver, said magnetic shielding material being retained inside said reinforcing structure; and said at least one sheet of magnetic shielding material being formed in a U-shape with a plurality of capture tabs along the edges thereof, said plurality of capture tabs being sized to fit into a plurality of shield capture bosses in each reinforcing shell.

7. The device for shielding at least one contactless smartcard or RFID tag from an external magnetic field of claim 6, wherein:

said reinforcing structure being a plastic material molded over said magnetic shielding material.

8. The device for shielding at least one contactless smartcard or RFID tag from an external magnetic field of claim 6, wherein:

said at least one sheet of magnetic shielding material being comprised of a soft magnetic alloy heat treated to fully develop its magnetic shielding properties in a hydrogen atmosphere.

9. The device for shielding at least one contactless smartcard or RFID tag from an external magnetic field of claim 6, further comprising:

said at least one sheet of magnetic shielding material having at least one slot formed therethrough, at least one card retention feature being formed in each said plastic reinforcing shell, said card retention feature extending through said at least one slot, said at least one card retention feature providing a frictional means for holding the contactless smartcard inside said at least one sheet of magnetic shielding material.

10. A device for shielding at least one contactless smartcard or RFID tag from an external magnetic field, comprising:

- a reinforcing structure being a pair of non-conductive reinforcing shells;
- at least one sheet of magnetic shielding material being shaped to substantially surround said at least one contactless smartcard or RFID tag, said magnetic shielding material having a high initial and maximum magnetic permeability, said magnetic shielding material reducing the strength of the external magnetic field to prevent communication between the at least one contactless smartcard or RFID tag and a remote transceiver, said magnetic shielding material being retained inside said reinforcing structure;
- said at least one sheet of magnetic shielding material being fabricated from a high nickel content alloy with sufficient electrical conductivity to shield capture the at least one contactless smartcard or RFID tag from electric fields; and
- said at least one sheet of magnetic shielding material being formed in a U-shape with a plurality of capture tabs along the edges thereof, said plurality of capture tabs being sized to fit into a plurality of shield bosses in each said plastic reinforcing shell.

11. The device for shielding at least one contactless smartcard or RFID tag from an external magnetic field of claim 10, wherein:

- said reinforcing structure being a plastic material molded over said magnetic shielding material.

12. The device for shielding at least one contactless smartcard or RFID tag from an external magnetic field of claim 10, further comprising:

- said at least one sheet of magnetic shielding material having at least one slot formed therethrough, at least one card retention feature being formed in each reinforcing shell, said card retention feature extending through said at least one slot, said at least one card retention feature providing a frictional means for holding the contactless smartcard inside said at least one sheet of magnetic shielding material.

13. The device for shielding at least one contactless smartcard or RFID tag from an external magnetic field of claim 10, wherein:

- said at least one sheet of magnetic shielding material being comprised of a soft magnetic alloy heat treated to fully develop its magnetic shielding properties in a hydrogen atmosphere.

* * * * *